US008367762B2

(12) United States Patent
Jaunky et al.

(10) Patent No.: US 8,367,762 B2
(45) Date of Patent: Feb. 5, 2013

(54) COMPOSITIONS COMPRISING GLYCIDYL ETHER COPOLYMERS

(75) Inventors: Guillaume Jaunky, Wesel (DE); Bernd Göbelt, Wesel (DE); Jürgen Omeis, Dorsten-Lembeck (DE)

(73) Assignee: Byk-Chemie GmbH, Wesel (DE)

( * ) Notice: Subject to any disclaimer, the term of this patent is extended or adjusted under 35 U.S.C. 154(b) by 0 days.

(21) Appl. No.: 13/113,525

(22) Filed: May 23, 2011

(65) Prior Publication Data

US 2011/0257326 A1     Oct. 20, 2011

Related U.S. Application Data

(63) Continuation of application No. PCT/EP2009/008281, filed on Nov. 20, 2009.

(30) Foreign Application Priority Data

Nov. 24, 2008 (DE) .......................... 10 2008 058 767
Sep. 4, 2009   (DE) .......................... 10 2009 040 068

(51) Int. Cl.
    *C08L 53/00*    (2006.01)
    *C08G 18/42*    (2006.01)
(52) U.S. Cl. ........................ 524/505; 524/539
(58) Field of Classification Search .................. 524/505
    See application file for complete search history.

(56) References Cited

U.S. PATENT DOCUMENTS

| 3,692,724 | A |   | 9/1972  | Van Dyk |         |
|-----------|---|---|---------|---------|---------|
| 3,779,966 | A |   | 12/1973 | Weeks   |         |
| 4,485,211 | A | * | 11/1984 | Okamoto | 525/57  |
| 4,755,563 | A |   | 7/1988  | West    |         |
| 5,085,698 | A |   | 2/1992  | Ma et al. |       |
| 5,145,944 | A | * | 9/1992  | Steinmann | 528/366 |
| 6,326,420 | B1 |  | 12/2001 | Olson et al. |    |
| 6,455,628 | B1 |  | 9/2002  | Ma et al. |       |
| 6,462,125 | B1 |  | 10/2002 | White et al. |    |
| 6,552,091 | B1 |  | 4/2003  | Boinowitz et al. |  |
| 6,642,301 | B2 |  | 11/2003 | White et al. |    |
| 6,849,679 | B2 |  | 2/2005  | Auschra et al. |  |
| 7,388,068 | B2 |  | 6/2008  | Falk et al. |     |
| 7,744,781 | B2 | * | 6/2010 | Tajima et al. | 252/519.33 |
| 2002/0011183 | A1 | | 1/2002 | Esselborn et al. | |
| 2003/0120022 | A1 | | 6/2003 | Sunder et al. |   |
| 2005/0085563 | A1 | | 4/2005 | Esselborn et al. | |
| 2008/0227917 | A1 | * | 9/2008 | Falk et al. | 525/187 |

FOREIGN PATENT DOCUMENTS

| CN | 1671475      | A  | 9/2005  |
| DE | 102 39 932   | A1 | 5/2004  |
| EP | 0 103 297    | A2 | 3/1984  |
| EP | 0 270 126    | A2 | 6/1988  |
| EP | 0 406 168    | A1 | 1/1991  |
| EP | 0 449 775    | A2 | 10/1991 |
| EP | 1 416 019    | A1 | 5/2004  |
| WO | 00 40630     | A1 | 7/2000  |
| WO | 2007 087961  | A2 | 8/2007  |

OTHER PUBLICATIONS

Taboada et al., Langmuir, 21, 5263-5271, 2005.*
Kaluzynski et al., Journal of Polymer Science: Part A: Polymer Chemistry, vol. 39, 955-963, 2001.*
Erberich et al., Macromolecules, 40, 3070-3079, 2007.*
Alexander Sunder, Controlled Synthesis of Hyperbranched Polyglycerols by Ring-Opening Multibranching Polymerization, Macromolecules 1999, 32, 4240-4246.
Ikladious. et al, Some studies on water-extended polyester, Actr Polymerica 38 (1987) Nr. 4, 226-229.
Harry J. Spinelli, Polymeric dispersants in ink jet technology, Research News, Adv. Mater. 1998, 10, No. 15, 1215-1218.
Gunther Buxbaum, Industrial Inorganic Pigments, second, completely revised edition, contents.
Michael Erberich, et al, Polyglycidols with Two Orthogonal Protective Groups: Preparation, Selective Deprotection, and Functionalization, Macromolecules 2007, 40, 3070-3079.
N.E. Ikladious, et al., Some Studies on Water-Extended Polyester, Journal of Elastomers and Plastics 1986 18: 62.
N. E. Ikladious, et al, Characteristics of Water Extended Polyester as a Function of Basic Emulsifiers, Initiators and Contained Water, Journal of Elastomers and Plastics 1997 29: 13.
K. Kaluzynski, Dihydrophilic Block Copolymers with Ionic and Nonionic Blocks. I. Poly(ethylene oxide)-b-polyglycidol with OP(O)(OH)2, COOH, or SO3H Functions: Synthesis and Influence for CaCO3 Crystallization, Journal of Polymer Science: Part A: Polymer Chemistry, vol. 39, 955-963 (2001) © 2001 John Wiley & Sons, Inc.
Pablo Taboada et al, Micellization and Drug Solubilization in Aqueous Solutions of a Diblock Copolymer of Ethylene Oxide and Phenyl Glycidyl Ether, Langmuir, vol. 22, No. 18, 2006.
Nonionic Surfactant: Organic Chemistry, edited by Nico M. van Os, Shell International Chemicals B.V., Amsterdam, Dekker, Inc., vol. 72 Surfactant Science Series (table of contents).
Pablo Taboada, Block Copolymers of Ethylene Oxide and Phenyl Glycidyl Ether: Micellization, Gelation, and Drug Solubilization, Langmuir 2005, 21, 5263-5271.
W. Herbst, K. Hunger, Industrial Organic Pigments, 3rd, Completely Revised Edition, Table of Contents, Wiley-VCH Verlag GmbH & Co. KGaA, 1997. N. Schönfeldt, Interface-active ethylene oxide adducts their preparation, properties, application and analysis, Supplementary volume, Table of Contents, Wissenschaftliche Verlagsgesellschaft mbH Stuttgart, 1984.
English-language translation of Chinese Office Action for related Chinese Application CN 200980155062.7 dated Oct. 8, 2012.

* cited by examiner

*Primary Examiner* — Hui Chin
(74) *Attorney, Agent, or Firm* — Norris McLaughlin & Marcus, P.A.

(57) ABSTRACT

The present invention relates to a composition comprising at least one amphiphilic glycidyl ether copolymer composed of special structural units I to V, wherein at least one of the structural units I has an aromatic group, and wherein the structural units may each be arranged in a block, a gradient or randomly, as a dispersant and a dispersed solid matter or as an emulsifier and an unsaturated polymer system in the form of a water-in-oil emulsion to be cured.

21 Claims, No Drawings

COMPOSITIONS COMPRISING GLYCIDYL ETHER COPOLYMERS

This application is a Continuation of PCT/EP2009/008281, filed Nov. 20, 2009, which claims foreign priority benefit under 35 U.S.C. §119 of the German Patent Application No. 10 2008 058 767.2 filed Nov. 24, 2008 and German Patent Application No. 10 2009 040 068.0 filed Sep. 4, 2009, the contents of all of which are incorporated herein by reference.

The present invention relates to a composition comprising at least one amphiphilic glycidyl ether copolymer constructed from the structural units I to V set out in the present specification, it being possible for the structural units to be of gradientlike, random or blocklike arrangement in accordance with the details given in the present specification, as dispersant and a dispersed solid, preferably a dispersed pigment, or as emulsifier and an unsaturated polymer system, which is to be cured, in the form of a water-in-oil emulsion.

In order for solids to be distributed stably and homogeneously in a liquid or solid medium, such as in paints, dispersions containing aqueous or organic solvents, or polymeric molding compounds, for example, dispersants are needed as auxiliaries.

For these purposes, dispersants are required to fulfill two different functions.

First, they must be able to interact with the solid's surface in such a way as to facilitate its wetting. This is achieved by the dispersant having particular chemical groups, known as anchor groups. Examples of hydrophilic anchor groups are tertiary amino groups, ammonium salts, phosphoric acid groups, carboxylic acid groups, sulfonic acid, amide, urethane or urea moieties.

For aqueous dispersions, suitable anchor groups include hydrophobic groups such as, for example, alkyl radicals, phenyl radicals or benzyl radicals, as are described in Adv. Mater. 1998, 10, 1215-1218, for example.

Second, dispersants are required to be highly compatible with the dispersing medium.

For organic dispersing media, therefore, dispersants must have hydrophobic radicals such as, for example, relatively long-chain alkyl radicals or aryl radicals. For aqueous dispersions, the dispersants ought to have water-soluble, hydrophilic radicals, such as salified carboxylic acids, for example.

Polymerization of monomers produces polymeric dispersants, which optionally may be modified subsequently by means of a polymerization-analogous reaction, in the side chains, for example. Depending on the conduct of the polymerization, the monomers are incorporated randomly or alternately, in gradientlike or blocklike fashion, in the polymer chain. In the case of a random or alternating construction of the polymer chains, such dispersants display very good solids-wetting properties, but a poorer stabilization of the solids dispersion as compared with dispersants having a gradientlike or blocklike construction. In contrast, the blocklike construction of dispersants having very good stabilizing properties may result, in the case of blocks having very different polarities, in the formation of micelles by the polymer chains, resulting in a poorer wetting behavior with respect to the surface of the solid to be dispersed.

One large group of dispersants is based on polymers formed by ethylenically unsaturated monomers such as, for example, acrylates or methacrylates, where the polymers employed may have a random, gradientlike or blocklike construction. Where polymers or copolymers have a random construction, they are prepared by radical polymerization with the aid of customary starters. Where they have a gradientlike or blocklike construction, they are prepared by a controlled polymerization such as, for example, atom transfer radical polymerization (ATRP), group transfer polymerization (GTP), nitroxyl mediated polymerization (NMP) or reversible addition fragmentation chain transfer (RAFT) process. Dispersants based on differently constructed polymers of this kind are mentioned in a multiplicity of patent specifications, including, as representatives, EP 1416019, U.S. Pat. Nos. 4,755,563, 5,085,698, 6,326,420, 6,455,628, 6,462,125, 6,642,301, 6,849,679 and WO 00/40630.

For the preparation of copolymers having a blocklike or gradientlike construction by controlled polymerization technologies, special and therefore expensive initiators or catalysts are typically required.

Another major group of dispersants is based on polyalkylene oxides (US 2002/0011183, US 2005/0085563, U.S. Pat. No. 6,552,091, WO 2007/087961).

Through polymerization of ethylene oxide, these dispersants exhibit a hydrophilic character, whereas, by copolymerization of propylene oxide, butylene oxide or styrene oxide, hydrophobic moieties can be incorporated into the polymer on which the dispersant is based. Since there is only a small selection of commercially available alkylene oxides and since only terminal OH groups are suitable as a functional group for modifications in these polymers, there is only a restricted possibility for the modification of the polymers and hence for their use as dispersants.

There exists, therefore, a need for dispersants which can be used not only in hydrophilic dispersion media but also in hydrophobic dispersion media and hence can be used for a multiplicity of fields of application, without exhibiting the disadvantages of the solids dispersions of the prior art.

The object of the present invention, therefore, was to provide agents for phase mediation between solid and liquid or liquid-liquid, these agents leading in both hydrophobic and hydrophilic media to correspondingly storage-stable systems having broad possibilities for application.

This object is achieved through the provision of the compositions of the invention, comprising at least one amphiphilic glycidyl ether copolymer constructed from the following structural unit I and at least one of the following structural units II-V, the structural unit IV always being arranged together with at least one of the structural units II, III, and V,

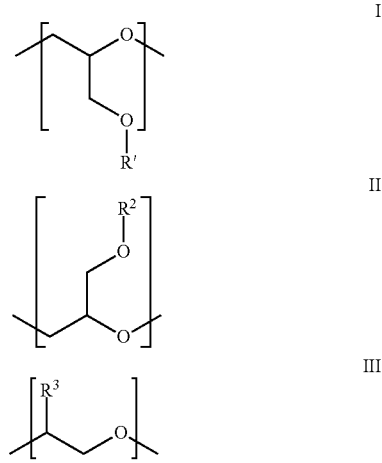

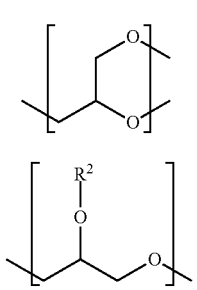

and from the end groups —O—R⁴ and/or R⁵, in which

R¹ is a linear or branched alkyl radical having preferably 1-20 C atoms or a cyclic alkyl radical having preferably 4-10 C atoms, an aryl radical, an arylalkylene radical, a heteroaryl radical or heteroaryl alkylene radical, in each of which the aryl or heteroaryl ring may be substituted;

R², identical or different at each occurrence, is hydrogen and/or is a carboxymethylene group or a corresponding salt or a corresponding alkyl ester group, a monoester radical or maleic acid or a corresponding mono salt, a phosphoric acid radical or a corresponding salt, a sulfonic acid radical or a corresponding salt or a sulfosuccinic acid radical or a corresponding salt, or up to 20% at most of the radicals R² are an OH-protective group, preferably acetal group or tert-butyl group;

R³ is hydrogen and/or a linear or branched alkyl radical having 1 to 6 C atoms and/or a cyclic alkyl radical having 4-6 C atoms;

R⁴ is a linear, branched or cyclic alkyl radical which may be substituted by at least one aryl radical or arylalkylene radical, or is an optionally substituted aryl radical or arylalkylene radical or a polyalkylene oxide radical which has preferably at least 2, more preferably 2 to 20 repeating units with an alkoxy group having preferably 1-5 C atoms;

R⁵, identical to or different from R², is a residue with the definition of R² with the exception of an OH-protective group, the structural units being of gradientlike, random or respectively blocklike arrangement, and the structural unit I being present at least 2 times, preferably 2 to 100, more preferably 2 to 50 times, of which at least one of the structural units I carries an aromatic radical, and where the fraction of the optionally present structural units IV is 0% to 50% at most of the total number of structural units II to V, as dispersant and at least one dispersed solid, preferably at least one dispersed pigment, or as emulsifier and an unsaturated polymer system, which is to be cured, in the form of a water-in-oil emulsion.

Polyglycidyl ether block copolymers have indeed already been disclosed in the prior art, but are in no way used as dispersants as in the compositions of the invention.

For instance, U.S. Pat. No. 4,485,211 describes polyglycidyl ether block copolymers by means of cathionical ring-opening polymerization and, optionally, modification to give quaternary ammonium salts.

These block copolymers, according to the disclosure in this US patent specification, find use preferably as difunctional chain extenders for preparing linear polymers of relatively high molecular mass. Also mentioned therein is their use as a viscosity-increasing agent, as a dispersing additive for polymerizations or as a separating agent for minerals.

EP-A-0406168 describes a product in which a phenyl glycidyl ether unit as end group is adducted to a polyalkylene oxide. Products of this kind, which have optionally been modified as well and are used optionally in combinations with further anionic or nonionic additives, can be used as dyeing assistants, among other things.

The publications in Langmuir 2006, 22, 7465-7470 and Langmuir 2005, 21, 5263-5271 each describe the formation of micelles by defined glycidyl block copolymers as a possibility for improving the solubility of active pharmaceutical ingredients that are of low solubility, such as griseofulvin. Formation of micelles, however, is an effect which is specifically unwanted, in comparison to the effect aimed at with the composition of the invention, since, in accordance with the invention, the intention is to obtain stable dispersions. An aqueous composition of a glycidyl block copolymer comprising 5 phenyl glycidyl ether units and 67 ethylene oxide units and an active pharmaceutical ingredient, such as griseofulvin, is therefore excluded from the present invention, as is an aqueous composition of a glycidyl block copolymer consisting of 2 blocks each comprising 71 or 62 or 38 ethylene oxide units and an intermediate block of 7, 8 or 12 phenyl glycidyl ether units, and an active pharmaceutical ingredient of low solubility, such as griseofulvin.

The glycidyl ether copolymers which are present in the compositions of the invention as dispersant or emulsifier are of random or gradientlike or blocklike construction, preferably of gradientlike or blocklike construction, more preferably of blocklike construction.

The glycidyl ether copolymers used in accordance with the invention contain the repeating structural unit I, the glycidyl ether copolymer preferably having at least one block of this repeating structural unit, and comprising at least one of the repeating structural units I with an aryl radical.

In another preferred embodiment, the glycidyl ether copolymer contains the repeating structural unit I and the repeating structural unit II, and with particular preference the glycidyl ether copolymer has at least one block of the repeating structural unit I and at least one block of the repeating structural unit II, or at least one block of the repeating structural unit I and at least one block of copolymerized structural units I and II.

Depending on the field of use, the glycidyl ether copolymer used in accordance with the invention may also be constructed from repeating structural units I and repeating structural units III, preferably from at least one block of the repeating structural unit I and at least one block of the repeating structural unit III or at least one block of copolymerized structural units I and III.

In the compositions of the invention, glycidyl ether copolymers of the repeating structural units I to III may also be present. The glycidyl ether copolymers preferably have at least one block of the repeating structural unit I and at least one block of the copolymerized repeating structural units II and III, or in each case at least one block of the repeating structural unit II and/or of the repeating structural unit III.

Branched glycidyl ether copolymers comprise, in addition to the repeating structural units I, at least one optionally repeating structural unit IV, which is copolymerized at least with one repeating structural unit II and/or III and/or V, it being possible for the repeating structural units to have a gradientlike or random, more preferably random, arrangement.

Where the structural unit IV is present in the glycidyl ether copolymer, its fraction is 50% at most, preferably 30% at most, very preferably 20% at most of the total number of structural units II to V that are present.

The glycidyl ether copolymers employed in accordance with the invention have the preferably hydrophobic structural unit I preferably 2 to 100 times, more preferably 2 to 50 times, very preferably 2 to 20 times, of which at least one of the structural units I carries an aromatic radical. Particularly preferred glycidyl ether copolymers are those in which the number of structural units II to V corresponds at least to the number of the structural unit I, preferably the number of structural units II to V being higher by at least 20%, more preferably by at least 50%, than the number of structural units I.

The structural unit I derives preferably from a glycidyl ether of the general formula (X)

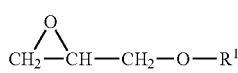
(X)

in which $R^1$ is a linear or branched alkyl radical, with preferably C1 to C20, more preferably a methyl, ethyl, propyl, butyl or 2-ethylhexyl radical, or is a cyclic alkyl radical having preferably 4 to 12 C atoms, more preferably a cyclohexyl radical, or is an aryl radical having 6 to 10 C atoms, which may be substituted by a short-chain alkyl radical, preferably a methyl, ethyl and/or propyl radical, or by a halogen atom, preferably chlorine, and with particular preference is a phenyl radical or naphthyl radical, or is an arylalkylene radical having preferably 7 to 10 C atoms, it being possible for the aryl radical to be substituted by short-chain alkyl radicals, preferably by a methyl, ethyl and/or propyl radical, and more preferably is a benzyl radical, or is a heteroaromatic radical having at least one oxygen or nitrogen atom in the aromatic ring, it being possible for the aromatic ring also to be substituted by short-chain alkyl radicals, preferably a methyl, ethyl and/or propyl radical, or by a halogen, preferably chlorine.

The structural unit II derives from a glycidyl ether of the general formula (Y)

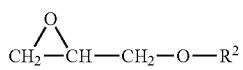
(Y)

in which the radical
$R^2$ is a protective group for the OH group, preferably a tert-butyl radical and/or an ethoxy ethyl radical.

After the polymerization, the OH groups protected with the radicals $R^2$ in the functional groups recited above may, in part or completely, be modified.

The structural unit III derives preferably from an alkylene oxide, more preferably from a linear, branched or cyclic alkylene oxide having 2 to 10 C atoms, very preferably from ethylene oxide, 1,2-propylene oxide and/or 1,2-butylene oxide.

The structural unit IV which is present in branched glycidyl ether copolymers derives preferably from oxirane compounds of the general formula (Z)

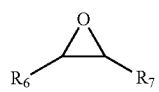
(Z)

in which
$R^6$ is hydrogen or an alkyl group having 1 to 4 C atoms, preferably methyl, and
$R^7$ is a C1 to C6 alkylene radical having at least one hydroxyl group, preferably a terminal hydroxyl group.

2,3-ethoxypropan-1-ol (glycidol) is used with particular preference for branching of the glycidyl ether copolymers.

Where $R^2$ in the structural unit V is H, the structural unit V derives from glycidol. It may be modified, in part or completely, by further reaction of the —OH functional group, as set out below.

Where $R^2$ in the structural unit II is H, the unit may also derive from glycidol and may be modified, in part or completely, by further reaction of the —OH group, as set out below.

The end groups —$OR^4$ are derived from the starter compounds of the inventively used glycidyl copolymers of which $R^4$ represents a linear, branched or cyclic alkyl radical with C1 to C10, preferably a C1 to C5 radical, which can be substituted by at least one, preferably terminal, aryl radical, more preferably with a phenyl radical, or a preferably terminal arylalkylene radical, more preferably with a benzyl radical, which may be substituted, or an alkoxypolyalkylene oxide radical, which has preferably of at least 2, more preferably of 2 to 20, very preferably of 2 to 12 repeating units of an alkylene oxide, preferably of an ethylene oxide and/or propylene oxide.

The end group $R^5$, identical to or different from $R^2$, has the definition of $R^2$, with the exception of an OH-protective group, and may be H, a carboxymethylene group or a corresponding C1 to C6 alkyl ester group, a monoester radical or maleic acid or succinic acid, or a corresponding monosalt, a phosphorus acid radical or a corresponding salt, a sulfonic acid radical or a corresponding salt, or a sulfosuccinic acid radical or a corresponding salt.

The glycidyl ether copolymers employed in accordance with the invention preferably have no ester moieties apart from any maleic acid monoester radicals present.

The glycidyl ether block copolymers employed in accordance with the invention are obtained preferably by polymerization with ring opening, very preferably by anionic polymerization with ring opening. The anionic polymerization takes place in accordance with customary processes known to the skilled person. Suitable process parameters, catalysts, and reaction media can be found in publications including that below, and in the references given therein:

Nonionic Surfactants: Organic Chemistry, Surfactant Science Series Volume 72 (edited by Nico M. Van Os).

The process description in the cited publication is hereby adopted as a description of anionic polymerization with ring opening, and is considered part of the disclosure content of the present specification.

In the examples below, the fundamental preparation of the glycidyl ether copolymers employed in accordance with the invention, and their subsequent modification, in 3 process steps, is elucidated by means of corresponding process schemes.

Both in the preparation of the hydrophobic structural units I and in the case of the more or less hydrophilic structural units II to V, a glycidyl ether, an alkylene oxide or an oxirane compound may be used for preparing the respective structural unit or mixture thereof.

Depending on the construction of the glycidyl ether copolymers employed in accordance with the invention, the starter molecule may first be polymerized with a starting compound that results in hydrophilic structural units, preferably a corresponding glycidyl ether, or with a glycidyl ether that results in a hydrophobic structural unit, preferably an aryl glycidyl ether.

Depending on the addition of the starting compounds to be polymerized anionically with ring opening, a gradientlike copolymer or, preferably, a glycidyl ether copolymer of blocklike construction may be obtained. The glycidyl ether copolymers thus obtained may have at least one hydrophilic block and at least one hydrophobic block or may have a block arrangement which goes beyond this, with alternation between hydrophobic and hydrophilic blocks.

The polymerization is preferably conducted such that some of the hydroxyl groups of the starting compound are deprotonated by alkali metal hydroxides or alkali metal alkoxides from 0.1% to 80%, preferably from 2% to 20%. Following removal of the water or alcohol by distillation, a mixture of starter and starter alcoholate is obtained. The polymerization with ring opening is typically conducted in the presence of a catalyst, without addition of a solvent. The polymerization may, however, also be conducted with accompanying use of a solvent which is inert under the alkoxylation conditions.

The glycidyl ethers to be polymerized are preferably added gradually to the mixture, and polymerized at a temperature between 40° C. and 120° C., preferably 50° C. and 100° C., more preferably 60° C. and 90° C. The living, anionic polymerization with ring opening is controlled by the rapid exchange of protons between the alcohol groups and alcoholate groups of the growing chains. At the end of the polymerization, neutralization is carried out with acid, and the resultant products are isolated by filtration. This may also be achieved with the aid of acidic ion exchangers.

Branched structures may be obtained by polymerizing glycidol or copolymerizing glycidol with the stated glycidyl ethers and/or with the stated alkylene oxides. Further details on reactions, reactants, and procedures can be found in the following publications: Macromolecules 1999, 32, 4240-4246 or US 2003/0120022.

The corresponding disclosures in the publication are hereby adopted and are considered part of the disclosure content of the present specification.

Where branched structural units as well are to be polymerized in the course of the anionic polymerization with ring opening, the anionic polymerization is preferably commenced by means of a starter molecule having a terminal hydroxyl group, preferably with polymerization of hydrophobic glycidyl ethers, to form a corresponding hydrophobic block.

The glycidyl ether copolymers employed in accordance with the invention have preferably 1% to 50%, particularly 1% to 30%, and very preferably 1% to 10%, based on the hydrophobic structural units, of branched structural units IV.

Where a or the hydrophilic block of the glycidyl ether polymer employed in accordance with the invention is constructed from the structural units III, the polymerization of the alkylene oxides may be conducted in accordance with known processes. References to and descriptions of suitable reaction conditions for customary processes known to the skilled person, and suitable apparatus for operation under pressure, are found in, for example, Nikolaus Schönfeldt, Grenzflächenaktive Äthylenoxid-Addukte, Wissen-schaftliche Verlagsgesellschaft mbH, Stuttgart 1984, and in the references cited therein.

The glycidyl ether copolymers employed in accordance with the invention are preferably also aftertreated after the polymerization with ring opening, in order, for example, to eliminate the ether moiety of the structural units deriving from preferably hydrophilic glycidyl ether, and to obtain functional hydroxyl groups for further reactions. Examples of corresponding protective groups which remain stable during the anionic polymerization with ring opening include ethoxyethyl groups of ethoxyethyl glycidyl ether. The same applies to the tert-butyl groups of tert-butyl glycidyl ether, which may be used for preparing hydrophilic structural units II. With very particular preference, the structural units II have the easily removable acetal groups as protective groups, where an ethoxyethyl glycidyl ether is used as starting compound.

The glycidyl ether employed may also have an allyl group as protective group, and so an allyl glycidyl ether may be used for preparing the structural units II. Indicated in the prior art (Makromolekül 2007, 40, 3070-3079) is the removal of protective groups, particularly the reaction partners and reaction conditions necessary for such removal.

Removal of the protective groups gives a copolymer, preferably a block copolymer, which in addition to the structural units I has structural units with free hydroxyl groups, as an intermediate.

This intermediate may be functionalized further via the free hydroxyl groups, in order, for example, to introduce anionic groups.

Thus, through reaction with polyphosphoric acid, the hydroxyl groups may be phosphorylated, and also, by means of concentrated sulfuric acid, oleum, sulfur trioxide or chlorosulfonic acid, sulfonic acid groups may be introduced. Through reaction of maleic anhydride and subsequent sulfonation with sodium sulfide, by known methods, it is possible to introduce a sulfosuccinic acid radical via the reaction with the free hydroxyl groups of the glycidyl copolymer. The introduction of a carboxymethylene group may take place with the aid of sodium hydride and sodium chloroacetate. Further methods for introducing a carboxyl group via an alkylene bridge may take place by addition reaction of a tert-butyl acrylate or acrylonitrile, with subsequent hydrolysis. It is possible, moreover, through reaction of the free hydroxyl groups of the intermediate with cyclic dicarboxylic anhydrides such as maleic anhydride or succinic anhydride, via an ester bond, to introduce carboxyl groups as well. Other methods for the introduction of sulfonic acid radicals, phosphoric acid radicals or carboxymethylene groups are described in, for example, Journal of Polymer Science: Part A: Polymer Chemistry 2001, 39, 955-963.

Where necessary, and in order to obtain sufficiently functioning anchor groups for the pigments to be dispersed, the different acid groups described above may also be converted into corresponding salts, through reaction with a base.

Suitable salts are ammonium salts, prepared by reaction with ammonium or with a suitable organic amine, tertiary amines, preferably triethylamine, alkanolamines, such as triethanolamine, for example, ammonium hydroxide or tetraalkylammonium hydroxide. Also suitable for reaction with the acid groups are alkali metal hydroxides, such as lithium hydroxide, sodium hydroxide or potassium hydroxide, for example, or corresponding carbonates such as, for example, potassium carbonate or dicarbonates such as potassium dicarbonate.

The compositions of the invention comprise the above-defined copolymers, preferably modified copolymers, as dispersants for solids, preferably for pigments, with the exception of silver halides. These compositions are aqueous or solventborne systems with dispersed solids, preferably dispersed pigments.

These compositions of the invention are suitable for numerous applications.

For instance, for the production of universal tinting pastes, pigment surface modifications, color resists for color filters or pigment-containing compositions, there is a requirement preferably for pigment dispersions which produce stable dispersions in different liquid media, such as in organic solvents or in water, and, accordingly, can also be incorporated further into aqueous media or into solvent-containing media, for further formulation. Thus, for example, a color resist is required in the course of its preparation to have good solubility in an organic solvent such as methoxypropyl acetate and to dissolve rapidly in an alkaline, aqueous solution, which may comprise surfactants. The composition of the invention that is employed accordingly has a direct influence on the properties of the end product.

The same applies to the preparation of pigmented paints, for whose processing, in spite of high pigment loading, a low viscosity is required. The compositions of the invention meet these and additional requirements, and so can be used without problems, and with improved properties, for a multiplicity of applications.

Hence the compositions may be used, for example, in the production or processing of paints, printing inks, papercoatings, leather and textile colorants, pastes, pigment concentrates, ceramics or cosmetic preparations when these systems comprise pigments and/or fillers as solids. In the production or processing, too, of casting and/or molding compounds based on synthetic, semisynthetic or natural macromolecular compounds, such as polyvinyl chloride, saturated or unsaturated polyesters, polyurethanes, polystyrene, polyacrylate, polyamide, epoxy resins, or polyolefins such as polyethylene or polypropylene, for example, they can be used. By way of example, the compositions of the invention which comprise dispersed pigments, fillers, and optionally other additives may be dispersed very effectively in casting compounds, PVC plastisols, gelcoats, polymer concrete, printed circuit boards, industrial coatings, wood and furniture coatings, vehicle finishes, marine paints, anticorrosion paints, can coatings and coil coatings, decorative paints and architecture paints, optionally following addition of binder.

Examples of typical binders are resins based on polyurethanes, cellulose nitrate, cellulose acetobutyrate, alkyd, melamine, polyester, chlorinated rubber, epoxy, and acrylate.

Examples of waterborne coatings are cathodic or anodic electrodeposition coatings for automobile bodies, for example. Further examples are renders, silicate paints, emulsion paints, waterborne paints based on water-thinnable alkyds, alkyd emulsions, hybrid systems, 2-component systems, polyurethane dispersions, and acrylate dispersions.

The compositions of the invention are suitable more particularly also as a basis for solids concentrates, such as pigment concentrates, for example. For such purposes, the copolymers described above are introduced into a dispersion medium such as organic solvents, plasticizers and/or water, and the solids to be dispersed, preferably pigments, are added with stirring. In addition, binders and/or other auxiliaries may be introduced as well into these compositions. Preferably, however, binder-free compositions already ensure stable pigment concentrates.

It is also possible to use the compositions of the invention as fluid solids concentrates. For such purposes, pigment presscakes, which may still comprise organic solvents, plasticizers and/or water, are mixed with the glycidyl ether copolymer, and the resulting mixture is dispersed. The solids concentrates of the invention, produced in various ways, can then be incorporated into different substrates such as, for example, alkyd resins, polyester resins, acrylate resins, polyurethane resins or epoxy resins. Pigments, however, can also be dispersed without water or solvent, directly with the glycidyl ether copolymers. These compositions of the invention are then suitable particularly for pigmenting thermoplastic and thermoset polymeric formulations.

The compositions of the invention can also be used with advantage in the production of inks for nonimpact printing processes such as thermal inkjet and the bubble jet process. These inks may be, for example, aqueous ink formulations, solvent-based ink formulations, solvent-free or low-solvent inks for UV applications, and waxlike inks.

The compositions of the invention can also be used in the production of color filters for liquid-crystal displays, liquid-crystal screens, color resolution devices, sensors, plasma screens, displays based on SED (surface-conduction electron-emitter display) and for MLCC (multilayer ceramic compounds). In these contexts, the liquid color filter coating material, also called color resist, will be applied by any of a very wide variety of application techniques such as spin coating, knife coating, combinations of both, or via nonimpact printing processes such as inkjet processes, for example. The MLCC technology is used in the production of microchips and printed circuit boards.

The compositions of the invention can also be used in cosmetic preparations such as, for example, makeup, powder, lipsticks, hair colorants, creams, nail varnishes, and sunscreen products.

These products may be present in the typical forms. The preparations of the invention comprising the above-defined copolymers as dispersants for pigments such as titanium dioxide or iron oxide may be incorporated into the vehicles that are customary in cosmetology, such as, for example, into water, into castor oils or into silicone oils.

The present invention accordingly further provides for the use of a glycidyl ether copolymer as dispersant for solids, preferably for pigments, or as phase mediator. These pigment dispersions of the invention comprising compositions of the invention may be used for producing a pigmented coating on a substrate, the pigment coating material being applied to the substrate and baked or cured and/or crosslinked thereon.

The present invention thus further provides coating compositions comprising the compositions of the invention, and coatings produced therefrom.

From the pigment dispersions of the invention it is also possible to prepare pigment pastes of the invention that are based thereon.

The compositions of the invention can be used alone or together with typical binders. When they are used in polyolefins it may be advantageous, for example, to add corresponding low molecular mass polyolefins as carrier materials to the compositions of the invention.

A composition of the invention also relates to solids in powder particle and/or fiber particle form, more particularly of pigments or polymeric fillers, which are coated with the glycidyl ether copolymers. This coating of organic or inorganic solids may be performed in a known way, as described in EP-A-0 270 126, for example. The dispersion medium may be removed from the resultant compositions of the invention, or may remain, with formation of pastes.

In the case of pigments, this coating of the pigment surface may take place during or after the synthesis of the pigments, by means, for example, of the addition of the glycidyl ether copolymers to the pigment suspension, or during or after the pigment finish.

The compositions of the invention that are obtained in this way are suitable as pretreated pigments very well for incorporation and are notable for enhanced viscosity, flocculation, and gloss behavior and for a higher color strength as compared with untreated pigments.

Examples of pigments are monoazo, disazo, triazo, and polyazo pigments, oxazine, dioxazine, and thiazine pigments, diketopyrrolopyrroles, phthalocyanines, ultramarine and other metal complex pigments, indigoid pigments, diphenylmethane, triarylmethane, xanthene, acridine, quinacridone, methine pigments, anthraquinone, pyranthrone, perylene and other polycyclic carbonyl pigments. Further examples of organic pigments are found in the following monograph: W. Herbst, K. Hunger "Industrial Organic Pigments", 1997 (Publisher: Wiley-VCH, ISBN: 3-527-28836-8). Examples of inorganic pigments are pigments based on carbon black, graphite, zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow), preferably with exception of silver halides. Further examples are given in the following monograph: G. Buxbaum, "Industrial Inorganic Pigments", 1998 (Publisher: Wiley-VCH, ISBN: 3-527-28878-3). Inorganic pigments may also be magnetic pigments based on pure iron, iron oxides and chromium oxides, or mixed oxides, metallic effect pigments comprising aluminum, zinc, copper or brass, and also pearlescent pigments and fluorescent and phosphorescent pigments.

Further examples are nanoscale organic or inorganic solids having particle sizes of below 100 nm, such as certain carbon black grades or particles consisting of a metal or semimetal oxide and/or hydroxide, and also particles composed of mixed metal and/or semimetal oxides and/or hydroxides.

It is possible, for example, to employ the oxides and/or oxide hydroxides of aluminum, of silicon, of zinc, of titanium, etc. for producing such extremely finely divided solids. The process of producing these oxidic and/or hydroxidic and/or oxide-hydroxidic particles may take place by way of any of a very wide variety of techniques, such as, for example, ion exchange processes, plasma processes, sol-gel processes, precipitation, comminution (by grinding, for example) or flame hydrolysis, etc. These nanoscale solids may also be what are called hybrid particles, composed of an inorganic core and an organic shell—or vice versa.

Examples of fillers in powder or fiber form are, for example, those composed of particles in powder or fiber form of aluminum oxide, aluminum hydroxide, silicon dioxide, kieselguhr, siliceous earth, quartz, silica gel, talc, kaolin, mica, perlite, feldspat, finely ground slate, calcium sulfate, barium sulfate, calcium carbonate, calcite, dolomite, glass or carbon. Further examples of pigments or fillers are found in, for example, EP-A-0 270 126. Flame retardants as well, such as aluminum or magnesium hydroxide, for example, and matting agents such as silicas, for example, may also, likewise, be outstandingly dispersed and stabilized.

The present invention further provides coating materials, pastes, and molding compounds comprising the preparations of the invention comprising glycidyl ether copolymers and one or more dispersed pigments, organic solvents and/or water, and also, optionally, binders and customary coating auxiliaries.

For such systems, from 0.10 to 500%, preferably 0.5 to 300%, more preferably 1% to 200%, by weight of the glycidyl ether copolymer are used, based on the solids content, preferably the pigment content.

The compositions of the invention in the form of water-in-oil emulsions may comprise the above-described glycidyl ether copolymers, preferably glycidyl ether block copolymers, as emulsifiers. Since emulsions are typically unstable systems, which do not form spontaneously, the dispersion of the phases in one another being instead obtained only by shaking, stirring, homogenization or spraying operations, emulsifiers are typically employed in order to stabilize these unstable structures.

In spite of the use of emulsifiers, there is still a risk, with typical emulsifiers, of separation of the phases taking place, with the dispersed water droplets separating into a coherent phase from the oil phase. Water-in-emulsions of this kind that are difficult to stabilize include what are called water-extended polyester resins, in which water droplets are emulsified in the polyester phase.

In this context, water acts as a cost-effective filler for reducing the production costs. Moreover, by means of water, heat of reaction can be absorbed. This continuous phase comprises unsaturated polyesters and $\alpha,\beta$-unsaturated monomers such as styrene. The emulsion or the unsaturated polyester is cured by means of free-radical initiators and transition-metal catalysts, with the aid of the $\alpha,\beta$-unsaturated monomer. Typically, the water-extended polyester emulsions themselves are stable only for a few hours with addition of various bases, as described in, for example, Journal of Elastomers and Plastics 1997, 29, 13-33; Acta Polymerica 1987, 38, 226-229; Journal of Elastomers & Plastics 1986, 18, 62-70; U.S. Pat. No. 3,779,966; U.S. Pat. No. 3,692,724.

The emulsions of the invention contain preferably 0.10%, more preferably 0.25%, very preferably 0.5% up to 10%, more preferably up to 5%, and very preferably up to 2%, by weight, of the glycidyl ether copolymer, based on the total weight of the emulsion.

With the glycidyl ether copolymers employed in accordance with the invention as emulsifiers it is possible surprisingly, together with water and with a mixture of unsaturated polyester resins and styrene, to maintain a water-in-oil emulsion stably over months.

To produce this composition of the invention, preferably a glycidyl ether (block) copolymer is incorporated easily, together with water, into the polyester formulation, to give a styrene-containing, water-extended polyester having a glycidyl ether (block) copolymer as emulsifier, as a water-in-oil emulsion. A corresponding composition in the form of a water-in-oil emulsion is additionally provided by the present invention.

EXAMPLES

The copolymers were characterized using the following measurement methods:

Gel Permeation Chromatography (GPC)

The chromatography was carried out at 40° C. using a high-pressure liquid chromatography pump (Bishoff HPLC 2200) under a refractive index detector (Waters 410).

The eluent was tetrahydrofuran with a flow rate of 1 mm/min. Conventional calibration was obtained using polystyrene standards. The number average molecular weight Mn, the weight average molecular weight Mw, and the polydispersity Q=Mw/Mn were calculated in accordance with the NTeqGPC program.

NMR Measurement

The NMR measurements were carried out on a Bruker DPX 300 at 300 MHz ($^1$H) or 75 MHz ($^{13}$C). Solvents used were deuterated chloroform (CDCl$_3$) and deuterated dimethyl sulfoxide (DMSO-d$_6$).

Examples 1 to 3

The glycidyl ether block copolymers shown by structural formula in the list below were synthesized.

| Examples | Structure of the block copolymers |
| --- | --- |
| EXAMPLE 1 | 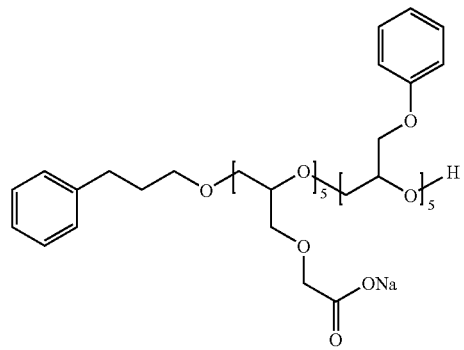 |
| EXAMPLE 2 | 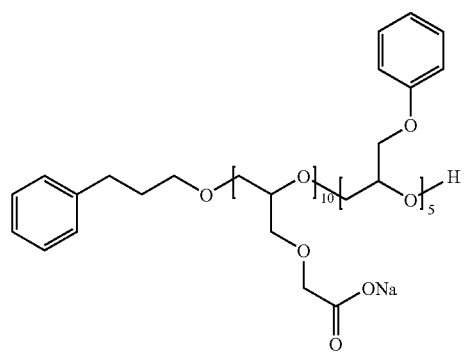 |
| EXAMPLE 3 | 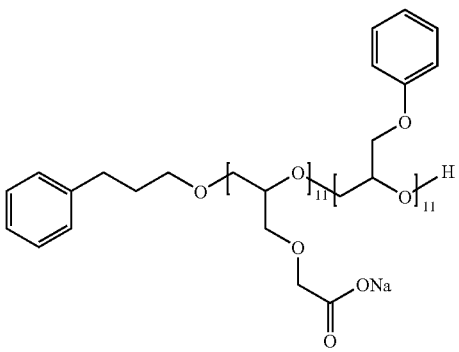 |

The block copolymers of examples 1 to 3 were prepared in 3 process steps, which are described below.

1$^{st}$ Process Step

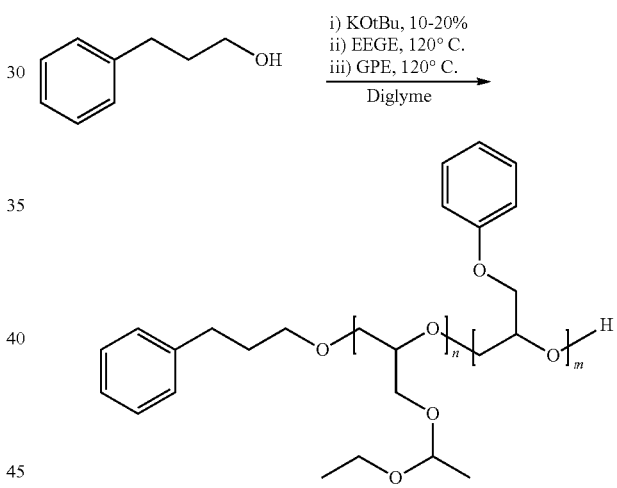

In accordance with this process scheme, dry diglyme [bis (2-methoxyethyl)ether] was introduced under nitrogen. The starter, 3-phenylpropan-1-ol (3-PP), was added to this initial charge, and a solution of potassium tert-butylate (KOtBu) in THF (1 mol/l) was added. The solution was stirred at 40° C. for about 20 minutes and the resultant tert-butanol was taken off under reduced pressure. The monomer ethoxyethyl glycidyl ether (EEGE) was added, and this solution was held at 100° C. for 3 hours (complete reaction according to $^1$H NMR analysis). Then the monomer phenyl glycidyl ether (PhGE) was added, and the reaction mixture is stirred for a further 20 hours (complete reaction of the monomer according to $^1$H NMR analysis). The solvent was removed distillatively by means of an oil vacuum pump at a temperature of 40 to 80° C., producing a red oil as the product.

The quantity figures for this 1$^{st}$ process step, polydispersity, and also the molecular weights and molecular-weight distribution, can be seen from table 1 below.

TABLE 1

| Product | Diglyme mL | 3-PP g (mmol) | KOtBu mmol | EEGE g (mmol) | PhGE g (mmol) | $\overline{M}_n$ GPC (THF) | $\overline{M}_w/\overline{M}_n$ GPC (THF) | m, n (1H-NMR) |
|---|---|---|---|---|---|---|---|---|
| EXAMPLE 1" | 30 | 1.86 (13.7) | 1.37 | 11.64 (79.6) | 11.89 (79.2) | 1600 | 1.17 | 5, 5 |
| EXAMPLE 2" | 20 | 1.36 (10.0) | 1.50 | 18.06 (123.5) | 9.35 (62.3) | 2400 | 1.15 | 5, 10 |
| EXAMPLE 3" | 30 | 0.93 (6.8) | 0.68 | 10.76 (73.6) | 10.40 (69.3) | 2400 | 1.21 | 11, 11 |

$2^{nd}$ Process Step

In accordance with the reaction scheme below, the acetal protective group is removed.

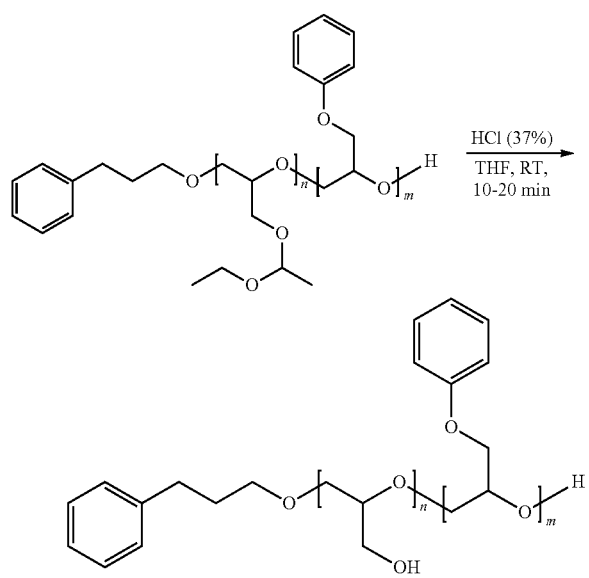

In order to remove the acetal protective group, the block copolymer obtained after the $1^{st}$ process step is dissolved in technical THF and treated with concentrated hydrochloric acid solution (37% strength by weight). After 20 minutes, anhydrous $K_2CO_3$ is added and stirring is continued for 5 minutes. Thereafter the solid constituents are removed by filtration and the solution is evaporated under reduced pressure. The oily residue is dried overnight by means of an oil vacuum pump at 45° C., to give a dark oil.

Table 2 below reports the quantity figures for the starting compounds for treating the block copolymers obtained in accordance with the $1^{st}$ process step, and sets out the yields, molecular weights, and molecular-weight distribution (polydispersity) obtained for the treatment.

TABLE 2

| Product | Block copolymer according to $1^{st}$ process step | Amount g (mmol of acetal groups) | m, n | THF mL | HCl (37%) mL | $\overline{M}_n$ GPC (THF) | $\overline{M}_w/\overline{M}_n$ GPC (THF) |
|---|---|---|---|---|---|---|---|
| EXAMPLE 1' | EXAMPLE 1" | 19.62 (60.6) | 5, 5 | 600 | 15 | 1200 | 1.10 |
| EXAMPLE 2' | EXAMPLE 2" | 22.77 (96.9) | 5, 10 | 450 | 40 | 1100 | 1.15 |
| EXAMPLE 3' | EXAMPLE 3" | 21.99 (71.0) | 11, 11 | 500 | 20 | 1400 | 1.19 |

3rd Process Step

In accordance with the process scheme below, in the 3rd process step, the block copolymer obtained after the 2nd process step was carboxymethylated and then the carboxyl groups were salified.

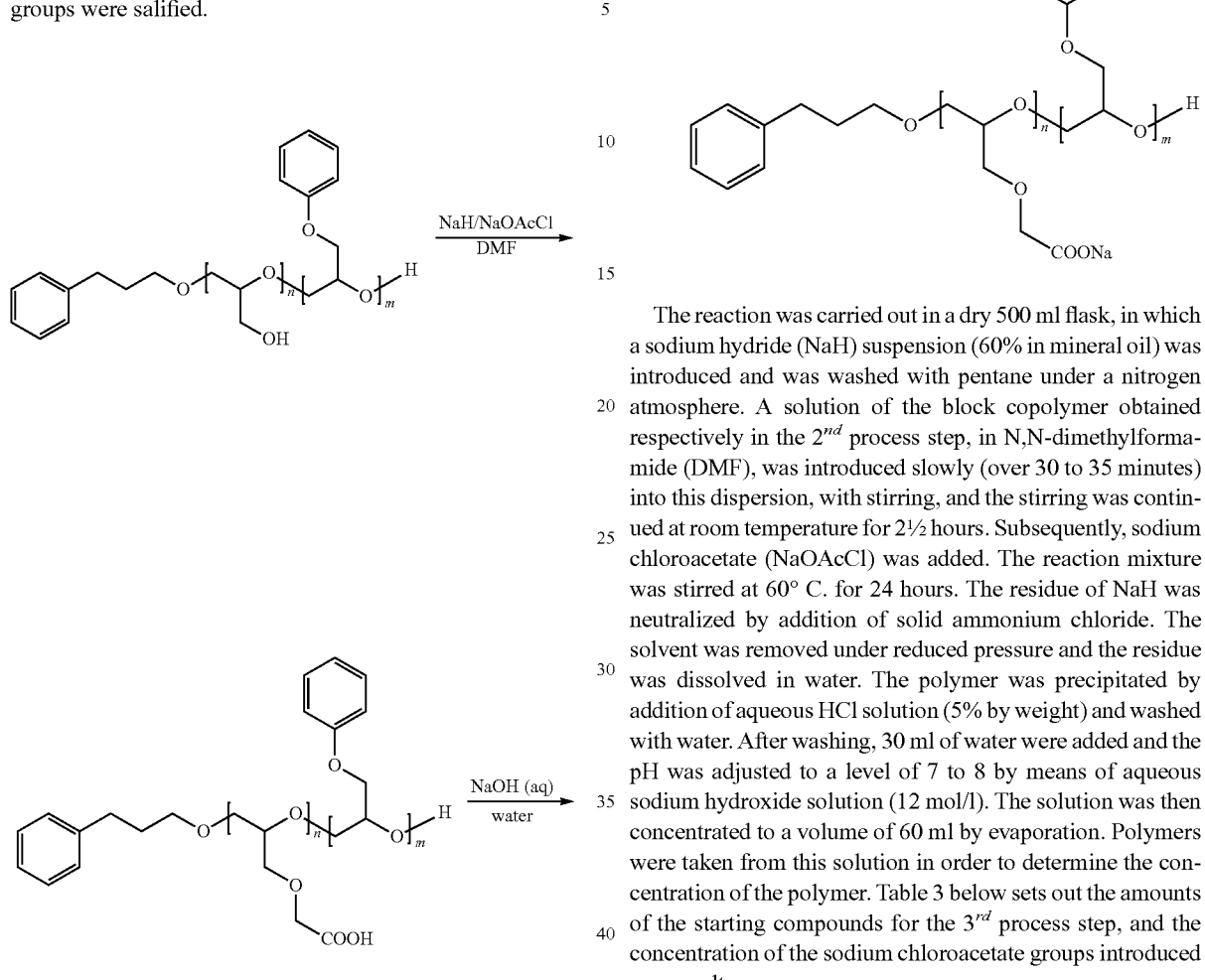

The reaction was carried out in a dry 500 ml flask, in which a sodium hydride (NaH) suspension (60% in mineral oil) was introduced and was washed with pentane under a nitrogen atmosphere. A solution of the block copolymer obtained respectively in the 2nd process step, in N,N-dimethylformamide (DMF), was introduced slowly (over 30 to 35 minutes) into this dispersion, with stirring, and the stirring was continued at room temperature for 2½ hours. Subsequently, sodium chloroacetate (NaOAcCl) was added. The reaction mixture was stirred at 60° C. for 24 hours. The residue of NaH was neutralized by addition of solid ammonium chloride. The solvent was removed under reduced pressure and the residue was dissolved in water. The polymer was precipitated by addition of aqueous HCl solution (5% by weight) and washed with water. After washing, 30 ml of water were added and the pH was adjusted to a level of 7 to 8 by means of aqueous sodium hydroxide solution (12 mol/l). The solution was then concentrated to a volume of 60 ml by evaporation. Polymers were taken from this solution in order to determine the concentration of the polymer. Table 3 below sets out the amounts of the starting compounds for the 3rd process step, and the concentration of the sodium chloroacetate groups introduced as a result.

TABLE 3

| Product | Block copolymer according to 2nd process step | Amount g (mmol OH groups) | m, n | DMF mL | NaH (60% by weight, mineral oil) g (mmol) | NaOAcCl g (mmol) | Concentration w % | pH |
|---|---|---|---|---|---|---|---|---|
| EXAMPLE 1 | EXAMPLE 1' | 14.40 (57.2) | 5, 5 | 150 | 3.35 (83.5) | 7.49 (64.3) | 23.4 | 7.9 |
| EXAMPLE 2 | EXAMPLE 2' | 14.52 (89.2) | 5, 10 | 190 | 5.35 (133.5) | 12.45 (106.9) | 26.2 | 7.5 |
| EXAMPLE 3 | EXAMPLE 3' | 16.64 (70.0) | 11, 11 | 200 | 4.19 (104.6) | 10.23 (87.9) | 22.8 | 7.2 |

Examples 4'/4 to 9'/9

The block copolymers shown below were prepared in accordance with process steps 1 to 3 as elucidated above, with the exception of the use of different starter compounds and the sequence of the polymerization of the various monomers. The corresponding structure of the block copolymers is as follows:

| Examples | m | n | Structure of the block copolymers |
|---|---|---|---|
| EXAMPLE 4' | 5 | 5 | 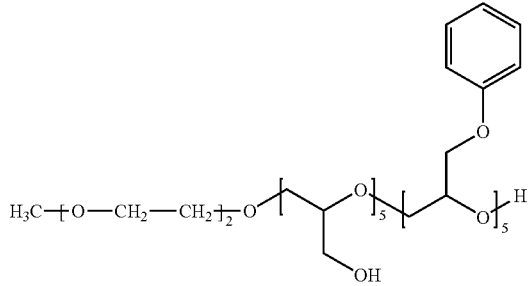 |
| EXAMPLE 4 | 5 | 5 | 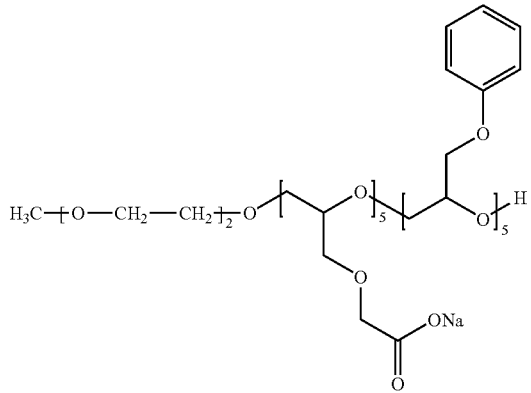 |
| EXAMPLE 5' | 5 | 10 | 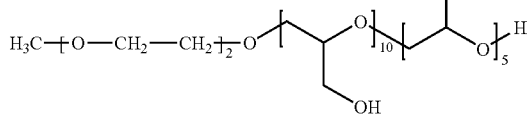 |
| EXAMPLE 5 | 5 | 10 | 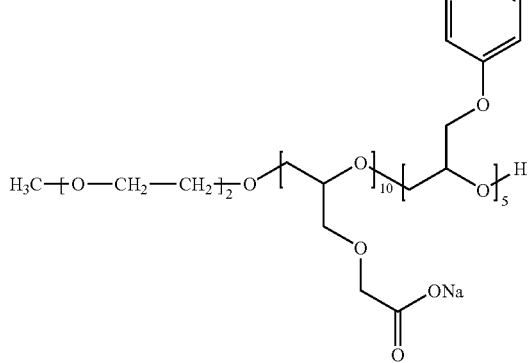 |

-continued
| Examples | m | n | Structure of the block copolymers |
|---|---|---|---|
| EXAMPLE 6' | 10 | 10 | 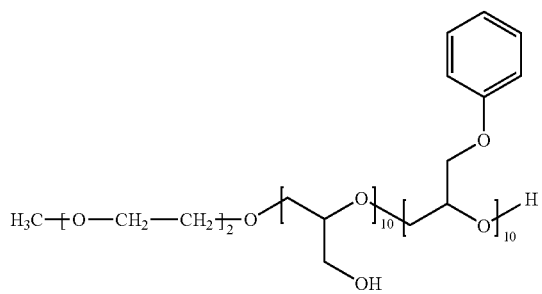 |
| EXAMPLE 6 | 10 | 10 | 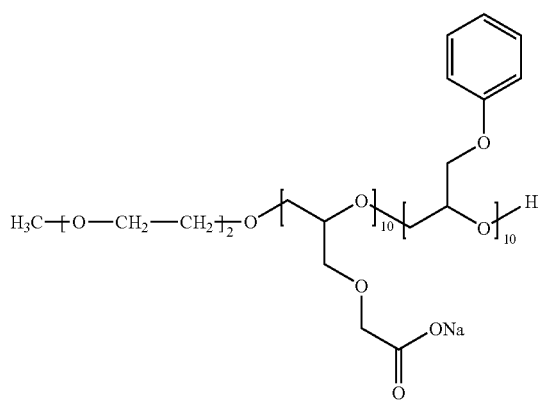 |
| EXAMPLE 7' | 4 | 5 | 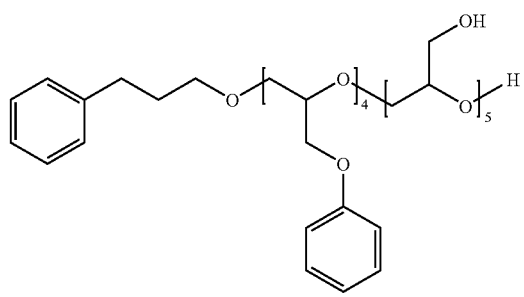 |
| EXAMPLE 7 | 4 | 5 | 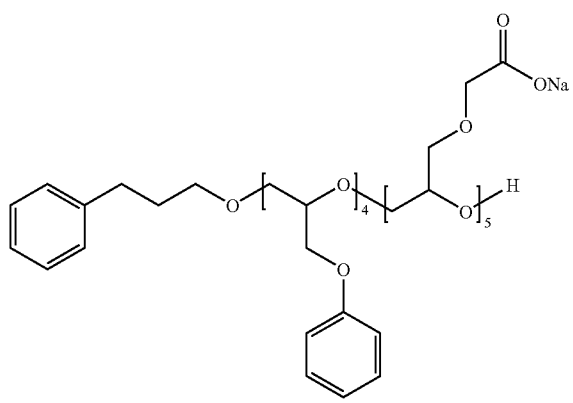 |

-continued
| Examples | m | n | Structure of the block copolymers |
|---|---|---|---|
| EXAMPLE 8' | 4 | 10 | 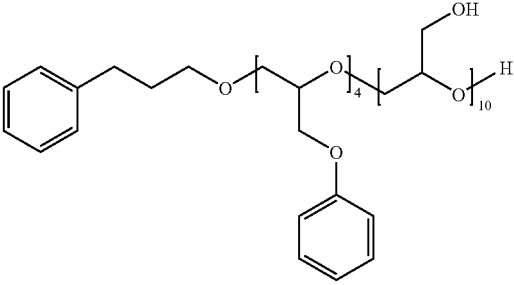 |
| EXAMPLE 8 | 4 | 10 | 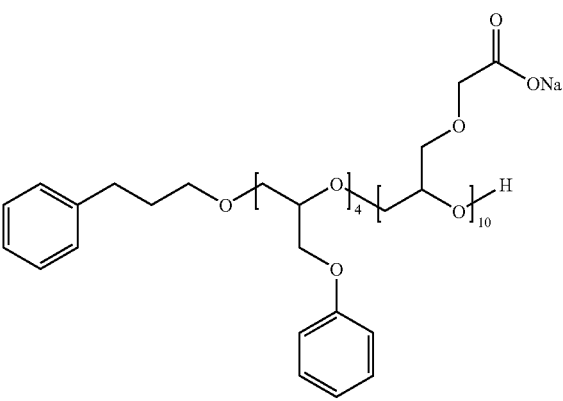 |
| EXAMPLE 9' | 9 | 10 | 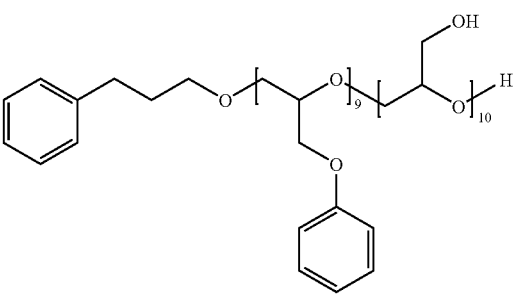 |
| EXAMPLE 9 | 9 | 10 | 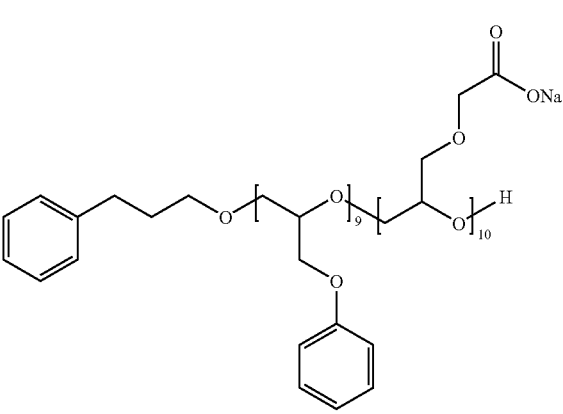 |

Examples 10 and 11 and Comparative Example 12

| Examples | m | n | Structure of the block copolymers |
|---|---|---|---|
| EXAMPLE 10 | 3 | ~10 | 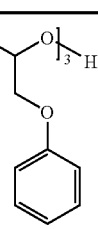 |
| EXAMPLE 11 | 3 | ~10 | 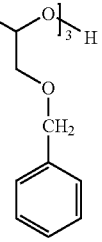 |
| Comparative EXAMPLE 12 | 3 | ~10 | 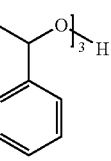 |

Example 10

For the preparation of the dispersant, a 250 ml 4-neck flask equipped with stirrer, condenser, thermometer, and dropping funnel was charged with 76.6 g (0.15 mol) of MPEG 500 (monohydroxy-functional EO polyether prepared starting from methanol, Mn 500 g/mol, from Clariant) and with 1.68 g (0.015 mol) of potassium tert-butylate. This initial charge was heated to 100° C. under $N_2$ and with stirring. tert-Butanol formed at 100° C. is removed with a gentle $N_2$ stream in one hour.

The temperature was then raised to 110° C. and 67.68 g (0.45 mol) of phenyl glycidyl ether were added dropwise over the course of 3 hours. After the end of the metered addition, stirring was continued at 110° C. for 5 hours more. The resulting copolymer was then dissolved in methanol and neutralized with acidic ion exchanger Amberlite IR-120H. Following removal of the ion exchanger by filtration, methanol was removed under reduced pressure.

Example 11

The dispersant was synthesized in a manner similar to that of EXAMPLE 10, except that benzyl glycidyl ether was used instead of phenyl glycidyl ether monomer.

Comparative Example 12

The dispersant (not inventive) was synthesized in accordance with the preparation instructions given for EXAMPLE 10, except that styrene oxide was used instead of phenyl glycidyl ether monomer.

Table 4 below reports the numerical weight averages of the molecular weight, and the polydispersity of the block copolymer, of examples 10 and 11 and of comparative example 12, in accordance with the chromatographic method indicated above.

TABLE 4

| | Example 10 | Example 11 | Comparative Example 12 |
|---|---|---|---|
| $\overline{M_n}$ GPC (THF) | 1171 | 1206 | 991 |
| $\overline{M_w}/\overline{M_n}$ GPC (THF) | 1.12 | 1.08 | 1.12 |

Example 13

In a first process step, a 4-necked round-bottom flask equipped with a reflux condenser, a thermometer, and a nitrogen inlet was charged with 38 g (0.28 mol) of 3-phenylpropan-1-ol as starter, and at room temperature, under a nitrogen atmosphere, 3.2 g (0.028 mol) of potassium tert-butylate were added. The temperature of the reaction mixture was raised to 110° C. and the tert-butanol formed was evaporated off with nitrogen gassing. Subsequently, 85.6 g (0.57 mol) of phenyl glycidyl ether as monomer were added dropwise over the course of an hour, and the mixture was polymerized for a further 2 hours through to total reaction (ascertained by means of $^1$H NMR analysis).

Added dropwise to the mixture over 5 hours were 21.11 g (0.28 mol) of glycidol and 166.64 g (1.14 mol) of ethoxyethyl glycidyl ether. Following the addition, heating took place for 2 hours more through to a total conversion (determined by means of $^1$H NMR analysis). For this intermediate (EXAMPLE 13'), using the chromatographic method set out above, the numerical weight-average molecular weight and the polydispersity of the block copolymer were ascertained and are set out in table 5 below.

In a further process step, the block copolymer EXAMPLE 13' was modified further by elimination of the acetal protective groups of the block copolymer. This was done by dissolving 120 g of the intermediate (EXAMPLE 13') in 360 ml of THF and 30 ml of $H_2O$. The clear solution was admixed with 16 g of HCl (37% by weight). The solution was stirred at 40° C. for 1 hour. The mixture was subsequently neutralized with stirring by addition of $Na_2CO_3$. Following the addition of sodium chloride, the THF phase was separated. The THF solution obtained was evaporated to dryness. Subsequently, THF was added again and the solution was dried over magnesium sulfate. Finally, THF was evaporated until an oily product was obtained (EXAMPLE 13). For this block copolymer, in accordance with the chromatographic method indicated above, the numerical weight average of the molecular weight and the polydispersity of the block copolymer were determined, the corresponding values being set out in table 5 below.

TABLE 5

| | EXAMPLE 13' | EXAMPLE 13 |
|---|---|---|
| $\overline{M_n}$ GPC (THF) | 849 | 694 |
| $\overline{M_w}/\overline{M_n}$ GPC (THF) | 1.49 | 1.43 |

Examples 14, 16 and 18 and Comparative Examples 15, 17 and 19
| Examples | Structure of the block copolymers |
|---|---|
| EXAMPLE 14 | 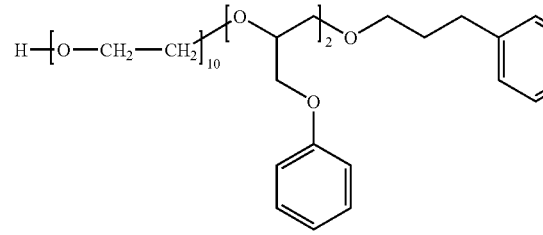 |
| Comparative EXAMPLE 15 | 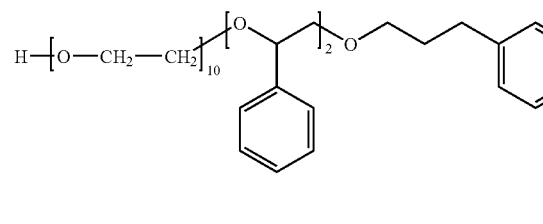 |
| EXAMPLE 16 | 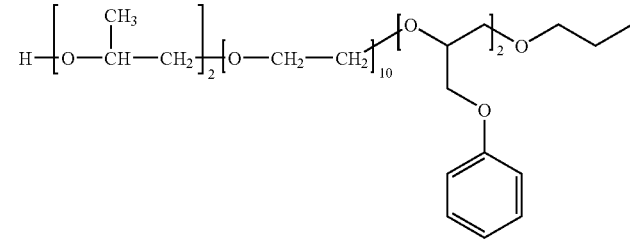 |
| Comparative EXAMPLE 17 | 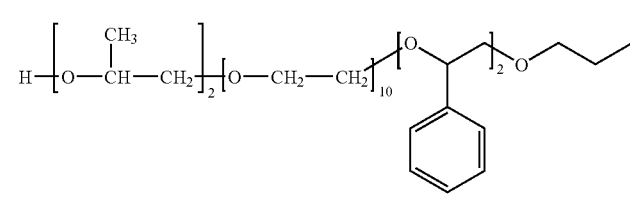 |
| EXAMPLE 18 | 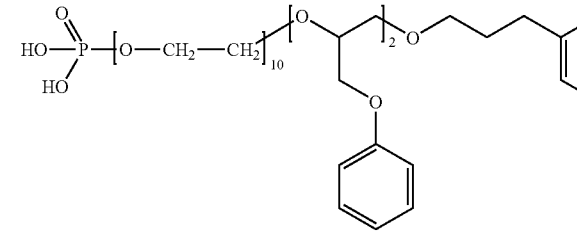 |
| Comparative EXAMPLE 19 | 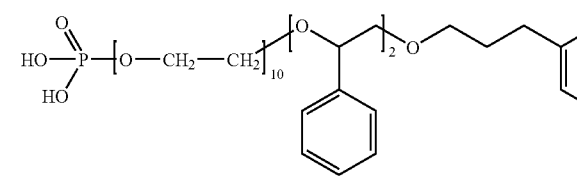 |

Example 14 a) For the preparation of the dispersant, in a first stage, a poly(phenyl glycidyl ether) macroinitiator prepared starting from 3-phenylpropan-1-ol was prepared (macroinitiator 14).
   For this purpose, a 500 ml 4-necked flask equipped with stirrer, condenser, thermometer and dropping funnel was charged with 136.2 g (1.0 mol) of 3-phenylpropan-1-ol and with 4.48 g (0.04 mol) of potassium tert-butylate. Under $N_2$ and with stirring, this initial charge was heated to 105° C. With a gentle $N_2$ stream, the tert-butanol formed at 105° C. was removed in an hour.
   The temperature was then raised to 120° C. and 300.34 g (2.0 mol) of phenyl glycidyl ether were added dropwise over the course of one hour. After the end of the metered addition, stirring was continued at 120° C. for 4 hours until it was possible to ascertain complete conversion of the monomer according to $^1$H NMR analysis.
b) The resulting macroinitiator 14 was subsequently ethoxylated.
   This alkoxylation was carried out in a pressure reactor equipped with stirrer and thermostat. 392.8 g (0.9 mol) of macroinitiator were introduced, and the reactor was closed, evacuated, and rendered inert using N2. Following heating to 135° C., 396.0 g (9.0 mol) of ethylene oxide were metered in at a rate such that a maximum pressure of 5 bar was not exceeded. After the end of the metered addition and subsequent reaction at 135° C. until the pressure remained constant, cooling took place to room temperature. The block copolymer obtained was subsequently dissolved in methanol and neutralized with an acidic ion exchanger, Amberlite IR-120H. Following the removal of the ion exchanger by filtration, the methanol was removed under reduced pressure.

Example 16 a) For preparing the dispersant, the poly(phenyl glycidyl ether) macroinitiator prepared starting from 3-phenylpropan-1-ol and obtained in accordance with example 14 a) was used as starter for an alkoxylation reaction.
b) Ethoxylation/propoxylation of macroinitiator 14
   The alkoxylation was carried out in a pressure reactor equipped with stirrer and thermostat. 392.8 g (0.9 mol) of macroinitiator 14 were introduced, and the reactor was closed, evacuated and rendered inert with N2. Following heating to 135° C., 396.0 g (9.0 mol) of ethylene oxide were metered in at a rate such that a maximum pressure of 5 bar was not exceeded. After the end of the metered addition and subsequent reaction at 135° C. until the pressure remained constant, 104.4 g (1.8 mol) of propylene oxide were metered in the same way. After the end of the metered addition and subsequent reaction at 135° C. until the pressure remained constant, cooling took place to room temperature. The block copolymer obtained was subsequently dissolved in methanol and neutralized with an acidic ion exchanger, Amberlite IR-120H. Following the removal of the ion exchanger by filtration, the methanol was removed under reduced pressure.

Example 18

60 g of the block copolymer obtained in accordance with example 14 were admixed with 8 g of polyphosphoric acid at 60° C. in a three-neck flask with reflux condenser and stirrer. The temperature was subsequently raised to 80° C. for 3 hours and, after cooling, the end group-modified block copolymer was obtained.

Comparative Examples 15, 17 and 19

The dispersants (not inventive) were synthesized in the same way as the dispersants of EXAMPLE 14, EXAMPLE 16 and EXAMPLE 18, except that styrene oxide was used instead of the phenyl glycidyl ether monomer.

Table 6 below reports the numerical weight average of the molecular weight and the polydispersity of the block copolymers of example 14 and example 16 and of comparative examples 15 and 17, respectively, in accordance with the chromatographic method indicated above.

TABLE 6

|  | Example 14 | Comparative Example 15 | Example 16 | Comparative Example 17 |
|---|---|---|---|---|
| $\overline{M_n}$ GPC (THF) | 1036 | 852 | 1164 | 883 |
| $\overline{M_w}/\overline{M_n}$ GPC (THF) | 1.17 | 1.22 | 1.19 | 1.29 |

In the application examples below, the application of the dispersants employed in accordance with the invention was tested in comparison to dispersants which cannot be used in accordance with the invention, as additives in pigment pastes and in corresponding paints.

I. Preparation of the Pigment Pastes (Binder-Free Dispersion Mode)

I. 1. Pigment Concentrate 1

|  | % by weight |
|---|---|
| Dispersant based on 100% active substance | 8 |
| BYK ®-017 | 1.0 |
| Flammruss 101 lamp black | 20.0 |
| Proxel GLX | 0.1 |
| Water | 70.9 |
|  | 100.0 |

Dispersion: 60 min at 40° C. and 8000 rpm, Dispermat CV, glass beads 1 mm

I. 2. Pigment Concentrate 2

|  | % by weight |
|---|---|
| Dispersant based on 100% active substance | 7.5 |
| BYK ®-017 | 1.0 |
| Hostaperm Pink E | 25.0 |
| Proxel GLX | 0.1 |
| Water | 66.4 |
|  | 100.0 |

Dispersion: 40 min at 40° C. and 10 000 rpm, Dispermat CV, glass beads 1 mm

I. 3. Pigment Concentrate 3

|  | % by weight |
| --- | --- |
| Dispersant based on 100% active substance | 8.7 |
| BYK ®-017 | 1.0 |
| Heliogen Blue L 7101F | 35.0 |
| Proxel GLX | 0.1 |
| Water | 55.2 |
|  | 100.0 |

Dispersion: 40 min at 40° C. and 10 000 rpm, Dispermat CV, glass beads 1 mm

I. 4. Pigment Concentrate 4

|  | % by weight |
| --- | --- |
| Dispersant based on 100% active substance | 6 |
| BYK ®-017 | 1.0 |
| BYK ®-420 | 0.5 |
| Bayferrox 130M | 60.0 |
| Proxel GLX | 0.1 |
| Water | 32.4 |
|  | 100.0 |

Dispersion: 40 min at 40° C. and 10 000 rpm, Dispermat CV, glass beads 1 mm (Adjusted with DMEA to pH 8)

| Proxel GLX | Biocide, manufacturer: ICI |
| --- | --- |
| Hostaperm Pink E | Pigment, manufacturer: Clariant |
| Heliogen Blue L 7101F | Pigment, manufacturer: BASF |
| Flammruss 101 | Pigment, manufacturer: Degussa |
| Bayferrox 130M | Pigment, manufacturer: Lanxess |
| BYK ®-017 | Defoamer, manufacturer: Byk Chemie |
| BYK ®-420 | Rheological additive, manufacturer: Byk Chemie |
| DMEA | Dimethylethanolamine |

II. Letdown

For this purpose, 2 commercially available white paints were used:

1. Zero PU white paint, aqueous 1-component polyurethane (satin gloss paint design, manufacturer: Zero-Lack)
2. Caparol white paint, solventborne, alkyd resin-based (Capalac high-gloss chromatic paint, manufacturer: Caparol)

| Letdown II A in each case | % by weight |
| --- | --- |
| Pigment concentrate 1-3 | 1.5 |
| Zero PU white paint | 30.0 |
|  | 31.5 |

Homogenization took place by shaking for 5 minutes.

| Letdown II B in each case | % by weight |
| --- | --- |
| Pigment concentrate 1-3 | 1.5 |
| Caparol white paint | 30.0 |
|  | 31.5 |

Homogenization took place by shaking for 5 minutes.

The assessment of the above-described pigment concentrates I. 1. to I. 3. and of letdown II A and letdown II B, comprising in each case the pigment Flammruss 101 (table 7), the pigment Hostaperm Pink E (table 8) or Heliogen Blue L 7101F (table 9), is set out below.

Measurement of the gloss values and ΔE values with color-guide sphere d/8° spin from Byk Gardner.

TABLE 7

(Flammruss 101)

| Dispersant | Pigment concentrate* | | Letdown II A | | Letdown II B | |
| --- | --- | --- | --- | --- | --- | --- |
|  | Storage stability$^a$ | Viscosity$^\#$ | Gloss R 60 | ΔE value | Gloss R 60 | ΔE value |
| Comp. EXAMPLE | 3 | (—) | 20 | 0.21 | 92 | 0.22 |
| EXAMPLE 10 | 2 | 0.1 | 19 | 0.24 | 91 | 0.12 |
| EXAMPLE 11 | 2 | 0.15 | 19 | 0.31 | 91 | 0.13 |
| EXAMPLE 7' | 2 | 0.8 | 19 | 0.76 | 92 | 1.9 |
| EXAMPLE 4' | 2 | 0.35 | 19 | 0.33 | 92 | 0.83 |

*Assessment after 1 day at 25° C.
$^\#$in Pa * s with 1/s shear rate, measured with Stresstech rheometer from Reologica Instruments AB, measuring cone C 2.5 1°
$^a$Assessment scale:
1: no sediment
2: agitatable sediment
3: nonagitatable sediment,
(—) viscosity cannot be assessed

TABLE 8

(Hostaperm Pink E)

| Dispersant | Pigment concentrate* | | Letdown II A | | Letdown II B | |
| --- | --- | --- | --- | --- | --- | --- |
|  | Storage stability$^a$ | Viscosity$^\#$ | Gloss R 60 | ΔE value | Gloss R 60 | ΔE value |
| Comp. EXAMPLE 12 | 2 | 0.51 | 16 | 2.86 | 84 | 2.63 |
| EXAMPLE 10 | 2 | 0.15 | 17 | 2.28 | 90 | 1.58 |
| EXAMPLE 11 | 2 | 0.23 | 18 | 1.75 | 90 | 1.41 |
| Comp. EXAMPLE 15 | 2 | 1.7 | 17 | 0.83 | 89 | 1.5 |
| EXAMPLE 14 | 2 | 0.57 | 18 | 0.62 | 89 | 1.46 |
| Comp. EXAMPLE 17 | 2 | 0.45 | 16 | 1.43 | 89 | 1.22 |
| EXAMPLE 16 | 2 | 0.27 | 17 | 1.14 | 89 | 1.09 |

TABLE 9

(Heliogen Blue L 7101 F)

| | Pigment concentrate* | | Letdown II A | | Letdown II B | |
|---|---|---|---|---|---|---|
| Dispersant | Storage stability$^a$ | Viscosity$^\#$ | Gloss R 60 | ΔE value | Gloss R 60 | ΔE value |
| Comp. EXAMPLE | 2 | 7.1 | 19 | 0.17 | 89 | 0.75 |
| EXAMPLE 10 | 2 | 4.0 | 19 | 0.08 | 89 | 0.58 |
| EXAMPLE 11 | 2 | 4.6 | 19 | 0.1 | 89 | 0.2 |

TABLE 10

(Bayferrox 130M)

| | Pigment concentrate* | | Letdown II A | | Letdown II B | |
|---|---|---|---|---|---|---|
| Dispersant | Storage stability$^a$ | Viscosity$^\#$ | Gloss R 60 | ΔE value | Gloss R 60 | ΔE value |
| Comp. EXAMPLE 19 | 2 | 10.5 | 23 | 4.67 | 84 | 1.61 |
| EXAMPLE 18 | 2 | 5.75 | 23 | 3.48 | 89 | 0.64 |

The results of examples 10 and 11 and 14 and 16 and 18 show that with the aid of the glycidyl ether block copolymers as dispersants it is possible to obtain pigment concentrates and paints having a lower viscosity but high pigment concentration with otherwise unchanged properties such as storage stability.

The lower viscosity and high storage stability of the pigment paste has the advantage that a high degree of pigment filling in the concentrate can be achieved.

V. Emulsions Comprising Glycidyl Ether Block Copolymers

V. 1. For preparing a water-in-oil emulsion comprising the block copolymer of EXAMPLE 3 as emulsifier, the procedure adopted was as follows:

75 g of an unsaturated polyester (NORSODYNE® S 22263 TAE from Cray Valley) were placed in a polypropylene container. With stirring using a high-speed stirrer at 1980 rpm, the emulsifier (i.e., the block copolymer EXAMPLE 3) was added as an aqueous solution. Based on the amount of the polyester, a 1% strength by weight emulsifier solution was added. Subsequently, further water was gradually added to the polyester-emulsifier-water preemulsion. The ratio of the total amount of water to polyester in the formulation was 25:75. When all the water had been added, the emulsion rested for 30 seconds, in order to allow the included air to escape, and was then transferred to a glass vial, and was stored, sealed in the vial, at room temperature.

V. 2. The water-in-oil emulsion had a viscosity (Brookfield RVT-type viscosimeter, spindle 5, 50 rpm, 23° C. of 288 M·Pa·s. The emulsion was storage-stable for at least 3 months.

The invention claimed is:

1. A composition comprising at least one amphiphilic glycidyl ether copolymer of blocklike construction, constructed from the following structural unit I and at least one of the following structural units II-V, the structural unit IV always being arranged together with at least one of the structural units II, III, and V,

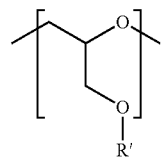

I

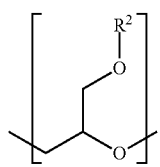

II

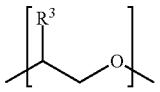

III

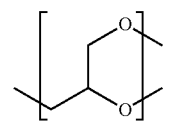

IV

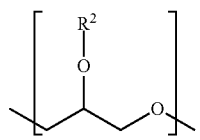

V and from the end groups —O—$R^4$ and/or $R^5$, in which
  $R^1$ is a linear or branched alkyl radical or a cyclic alkyl radical, an aryl radical, an aryl alkylene radical, a heteroaryl radical or heteroaryl alkylene radical, in each of which the aryl or heteroaryl ring may be substituted;
  $R^2$, identical or different at each occurrence, is hydrogen and/or is a carboxymethylene group or a corresponding salt or a corresponding alkyl ester group, a monoester radical of maleic acid or a corresponding mono salt, a phosphoric acid radical or a corresponding salt, a sulfonic acid radical or a corresponding salt or a sulfosuccinic acid radical or a corresponding salt, or up to 20% at most of the radicals $R^2$ are an OH-protective group;
  $R^3$ is hydrogen and/or a linear or branched alkyl radical having 1 to 6 C atoms and/or a cyclic alkyl radical having 4-6 C atoms;
  $R^4$ is a linear, branched or cyclic alkyl radical which may be substituted by at least one aryl radical or arylalkylene radical, or is an optionally substituted aryl radical or arylalkylene radical or a polyalkylene oxide radical;
  $R^5$, identical to or different from $R^2$, is a residue with the definition of $R^2$ with the exception of OH-protective groups,
  the structural units being of gadientlike, random or respectively blocklike arrangement, and
  the structural unit I being present at least 2 times, the glycidyl ether copolymer has at least one block of the repeating structural unit I, of which at least one of the repeating structural units I carries an aromatic radical,
  and where the fraction of the optionally present structural units IV is 0% to 50% at most of the total number of structural units II to V, as dispersant and at least one dispersed solid or
as emulsifier and an unsaturated polymer system, which is to be cured, in the form of a water-in-oil emulsion,
with the provisos that (i) an aqueous composition of a glycidyl block copolymer comprising 5 phenyl glycidyl ether units and 67 ethylene oxide units and an active pharmaceutical ingredient is excluded and (ii) an aqueous composition of a glycidyl block copolymer consisting of 2 blocks each comprising 71 or 62 or 38 ethylene oxide units and an intermediate block of 7.8 or 12 phenyl glycidyl ether units and an active pharmaceutical ingredient is excluded.

2. A composition as claimed in claim 1, wherein the number of structural units II to IV of the glycidyl ether copolymer corresponds at least to the number of structural units I.

3. A composition as claimed in claim 1, wherein at least one dispersed pigment is present as dispersed solid.

4. A composition as claimed in claim 1, wherein the glycidyl ether copolymer has at least one block of the repeating structural unit I and at least one block of the repeating structural unit II.

5. A composition as claimed in claim 1, wherein the glycidyl ether copolymer has at least one block of the repeating structural unit I and at least one block of the repeating structural unit III.

6. A composition as claimed in claim 1, wherein the glycidyl ether copolymer has at least one block of the repeating structural unit I and at least one block of repeating structural units II and III.

7. A composition as claimed in claim 1, wherein the glycidyl ether copolymer has as starting bock, associated with the starter molecule, a block of the repeating structural unit I and as finishing block, associated with one of the end groups, a block of the structural unit IV and of at least one copolymerized structural unit II, III or V.

8. A composition as claimed in claim 7, wherein the fraction of structural unit IV is 30% at most, of the total number of structural units II to V present.

9. A composition as claimed in claim 1., wherein in the structural units $R^1$ is a phenyl or naphthyl radical, which may optionally be substituted, or is a benzyl radical;
$R^2$ has the definition indicated in claim 1, with salts present being alkyl metal salts or ammonium salts;
$R^3$ is hydrogen or a methyl radical;
$R^4$ is an alkyl radical having 1 to 10 C atoms, a phenyl alkylene radical having 7 to 10 C atoms or a polyethylene oxide radical or a radical of a copolymer of ethylene oxide and propylene oxide having in each case 2 to 5 repeating alkylene oxide units;
$R^5$, to or different from $R^2$, is a residue with the definition indicated for $R^2$, with the exception of an OH-protective group;
the structural unit I being present 2 to 20 times.

10. A composition as claimed in claim 1, wherein the glycidyl ether copolymer has been prepared by anionic polymerization.

11. A composition as claimed in claim 1, wherein it is present as an aqueous dispersion.

12. A method of using a glycidyl ether copolymer as claimed in claim 1 as dispersant or phase mediator.

13. The method as claimed in claim 12 for dispersing solids.

14. The method as claimed in claim 12 for preparing a composition.

15. A pigment dispersion comprising a composition as claimed in claim 1.

16. A pigment paste comprising a pigment dispersion as claimed in claim 15.

17. A coating composition comprising a composition as claimed in claim 1.

18. A coating of a coating composition as claimed in claim 17.

19. A molding compound comprising a composition as claimed in claim 1.

20. A molding formed from a molding composition as claimed in claim 19.

21. A composition as claimed in claim 1, wherein the unsaturated polymer system comprises an unsaturated polyester and α,β-unsaturated monomers.

* * * * *